US012718325B2

(12) United States Patent
Yu

(10) Patent No.: US 12,718,325 B2
(45) Date of Patent: Aug. 25, 2026

(54) SYSTEMS AND METHODS FOR GENERATING A COMBINED IMAGE OF AT LEAST TWO IMAGES

(71) Applicant: SHANGHAI UNITED IMAGING HEALTHCARE CO., LTD., Shanghai (CN)

(72) Inventor: Wenjun Yu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 752 days.

(21) Appl. No.: 18/058,244

(22) Filed: Nov. 22, 2022

(65) Prior Publication Data

US 2023/0082641 A1 Mar. 16, 2023

Related U.S. Application Data

(63) Continuation of application No. PCT/CN2020/135110, filed on Dec. 10, 2020.

(30) Foreign Application Priority Data

May 22, 2020 (CN) ......................... 202010440417.5

(51) Int. Cl.
*G06T 5/50* (2006.01)
*G06T 7/33* (2017.01)

(52) U.S. Cl.
CPC ................ *G06T 5/50* (2013.01); *G06T 7/337* (2017.01); *G06T 2207/20212* (2013.01)

(58) Field of Classification Search
CPC . G06T 5/50; G06T 7/337; G06T 2207/20212; G06T 3/153; G06T 3/4038; G06T 3/14; G06T 11/008
See application file for complete search history.

(56) References Cited

U.S. PATENT DOCUMENTS

| | | | | |
|---|---|---|---|---|
| 8,712,186 B2 | 4/2014 | Glocker et al. | | |
| 2014/0153797 A1* | 6/2014 | Wan | G06T 7/38 | 382/128 |

(Continued)

FOREIGN PATENT DOCUMENTS

| | | | | |
|---|---|---|---|---|
| CN | 104268846 A | | 1/2015 | |
| CN | 106683058 A | * | 5/2017 | G06T 3/4038 |

(Continued)

OTHER PUBLICATIONS

Kumar, Abhinav, et al. "Automatic image alignment and stitching of medical images with seam blending." World Academy of Science, Engineering and Technology 65 (2012). (Year: 2012).*

(Continued)

*Primary Examiner* — Andrew W Bee
(74) *Attorney, Agent, or Firm* — METIS IP LLC

(57) ABSTRACT

The present disclosure may provide a system. The system may obtain a first image of a first region of a subject and a second image of a second region of the subject. The first region and the second region may have an overlapping region. The system may generate a first corrected image by correcting the first image based on the second image and a second corrected image by correcting the second image based on the first image. The system may generate a combined image by combining the first corrected image and the second corrected image.

20 Claims, 10 Drawing Sheets

900

Obtaining a first image of a first region of a subject — 910

Obtaining a second image of a second region of the subject, the first region and the second region being adjacent and having an overlapping region — 920

Determining a first image section of the first image corresponding to the overlapping region based on a DICOM protocol of the subject — 930

Determining a second image section of the second image corresponding to overlapping region based on the DICOM protocol of the subject — 940

Determining a first rigid registration image section corresponding to the first image section and a second rigid registration image section corresponding to the second image section by performing a rigid registration on the first image section and the second image section — 950

960:

Performing a first non-rigid registration on the first rigid registration image section using the second rigid registration image section as a reference and generate a first non-rigid registration result based on the first non-rigid registration Performing a second non-rigid registration on the second rigid registration image section using the first rigid registration image section as a reference and generate a second non-rigid registration result based on the second non-rigid registration To be continued

(56) References Cited

U.S. PATENT DOCUMENTS

| | | | |
|---|---|---|---|
| 2017/0011488 | A1 | 1/2017 | Cohen et al. |
| 2017/0243351 | A1 | 8/2017 | Li et al. |
| 2017/0337672 | A1 | 11/2017 | Zou et al. |
| 2018/0197303 | A1 | 7/2018 | Jordan et al. |
| 2020/0022666 | A1 | 1/2020 | Solbiati et al. |

FOREIGN PATENT DOCUMENTS

| | | | | |
|---|---|---|---|---|
| CN | 108550113 | A | | 9/2018 |
| CN | 109325971 | A | | 2/2019 |
| CN | 109754448 | A | * | 5/2019 |
| CN | 110136083 | A | | 8/2019 |
| CN | 111583120 | A | | 8/2020 |

OTHER PUBLICATIONS

Pan, Jun, et al. "A multi-resolution blending considering changed regions for Orthoimage mosaicking." Remote sensing 8.10 (2016): 842. (Year: 2016).*

International Search Report in PCT/CN2020/135110 mailed on Mar. 11, 2021, 4 pages.

Written Opinion in PCT/CN2020/135110 mailed on Mar. 11, 2021, 5 pages.

* cited by examiner

To be continued

SYSTEMS AND METHODS FOR GENERATING A COMBINED IMAGE OF AT LEAST TWO IMAGES

CROSS-REFERENCE TO RELATED APPLICATIONS

This application is a continuation of International Pat. Application No. PCT/CN2020/135110, filed on Dec. 10, 2020, which claims priority to Chinese Patent Application No. 202010440417.5 filed on May 22, 2020, the entire contents of which are hereby incorporated by reference.

TECHNICAL FIELD

The present disclosure generally relates to image processing, and in particular, to systems and methods for generating a combined image by combining different images.

BACKGROUND

With the development of image stitching technology, a plurality of images of different regions of a subject with overlapping regions may be acquired and combined to form a global image of the subject. However, since deformation information of the plurality of images may be different due to different acquisition parameters (e.g., magnetic inhomogeneity), there may be content discontinuities in the combined global image. Thus, it is desirable to provide systems and methods for accurately generating a combined image by combining different images, thereby improving a content continuity of the combined image.

SUMMARY

According to one aspect of the present disclosure, a system may be provided. The system may include at least one storage device including a set of instructions and at least one processor in communication with the at least one storage device. When executing the set of instructions, the at least one processor may be configured to cause the system to: obtain a first image of a first region of a subject; obtain a second image of a second region of the subject, the first region and the second region having an overlapping region; generate a first corrected image by correcting the first image based on the second image; generate a second corrected image by correcting the second image based on the first image; and generate a combined image by combining the first corrected image and the second corrected image.

In some embodiments, wherein to generate the first corrected image by correcting the first image based on the second image, the at least one processor may be directed to: generate a first rigid registration image corresponding to the first image and a second rigid registration image corresponding to the second image by performing a rigid registration on the first image and the second image; and generate the first corrected image by correcting the first rigid registration image based on the second rigid registration image; and to generate the second corrected image by correcting the second image based on the first image, the at least one processor is directed to: generate the second corrected image by correcting the second rigid registration image based on the first rigid registration image.

In some embodiments, wherein to generate the first rigid registration image corresponding to the first image and the second rigid registration image corresponding to the second image by performing the rigid registration on the first image and the second image, the at least one processor may be directed to: determine a first image section of the first image corresponding to the overlapping region; determine a second image section of the second image corresponding to the overlapping region; and generate the first rigid registration image corresponding to the first image and the second rigid registration image corresponding to the second image by performing the rigid registration on the first image section and the second image section.

In some embodiments, wherein to generate the first corrected image by correcting the first rigid registration image based on the second rigid registration image, the at least one processor may be directed to: generate a first non-rigid registration result by performing a non-rigid registration on the first rigid registration image based on the second rigid registration image; and generate the first corrected image based on the first non-rigid registration result; and to generate the second corrected image by correcting the second rigid registration image based on the first rigid registration image, the at least one processor may be directed to: generate a second non-rigid registration result by performing a non-rigid registration on the second rigid registration image based on the first rigid registration image; and generate the second corrected image based on the second non-rigid registration result.

In some embodiments, the non-rigid registration may be performed based on a transformation function associated with a similarity between the first rigid registration image and the second rigid registration image.

In some embodiments, wherein to generate the first corrected image based on the first non-rigid registration result, the at least one processor may be directed to: determine a first correction weight function corresponding to a first image section of the first rigid registration image corresponding to the overlapping region; and generate the first corrected image based on the first non-rigid registration result and the first correction weight function; and to generate the second corrected image based on the second non-rigid registration result, the at least one processor may be directed to: determine, based on the first correction weight function, a second correction weight function corresponding to a second image section of the second rigid registration image corresponding to the overlapping region; and generate the second corrected image based on the second non-rigid registration result and the second correction weight function.

In some embodiments, the first correction weight function may be associated with a height of the first image section and distances of pixels in the first image section to an edge of the first image section. A sum of the first correction weight function and the second correction weight function is 1.

In some embodiments, the farther a pixel in the first image section from an upper edge of the first image section is, the smaller a first correction weight function of the pixel may be.

In some embodiments, wherein to generate the combined image by combining the first corrected image and the second corrected image, the at least one processor may be directed to: determine a first fusion weight function corresponding to a first image section of the first corrected image corresponding to the overlapping region; determine, based on the first fusion weight function, a second fusion weight function corresponding to a second image section of the second corrected image corresponding to the overlapping region; determine a fused image corresponding to the overlapping region based on the first image section, the first fusion weight function, the second image section, and the second fusion weight function; and generate the combined image by combining remainder sections of the first corrected image, remainder sections of the second corrected image, and the fused image.

In some embodiments, the first fusion weight function may be associated with distances of pixels in the first image section to an edge of the first image section. A sum of the first fusion weight function and the second fusion weight function may be 1.

According to another aspect of the present disclosure, a method may be provided. The method may be implemented on a computing device including at least one processor, at least one storage medium, and a communication platform connected to a network. The method may include: obtaining a first image of a first region of a subject; obtaining a second image of a second region of the subject, the first region and the second region having an overlapping region; generating a first corrected image by correcting the first image based on the second image; generating a second corrected image by correcting the second image based on the first image; and generating a combined image by combining the first corrected image and the second corrected image.

In some embodiments, the generating the first corrected image by correcting the first image based on the second image may include: generating a first rigid registration image corresponding to the first image and a second rigid registration image corresponding to the second image by performing a rigid registration on the first image and the second image; and generating the first corrected image by correcting the first rigid registration image based on the second rigid registration image; and the generating the second corrected image by correcting the second image based on the first image may include: generating the second corrected image by correcting the second rigid registration image based on the first rigid registration image.

In some embodiments, the generating the first rigid registration image corresponding to the first image and the second rigid registration image corresponding to the second image by performing the rigid registration on the first image and the second image may include: determining a first image section of the first image corresponding to the overlapping region; determining a second image section of the second image corresponding to the overlapping region; and generating the first rigid registration image corresponding to the first image and the second rigid registration image corresponding to the second image by performing the rigid registration on the first image section and the second image section.

In some embodiments, the generating the first corrected image by correcting the first rigid registration image based on the second rigid registration image may include: generating a first non-rigid registration result by performing a non-rigid registration on the first rigid registration image based on the second rigid registration image; and generating the first corrected image based on the first non-rigid registration result; and the generating the second corrected image by correcting the second rigid registration image based on the first rigid registration image may include: generating a second non-rigid registration result by performing a non-rigid registration on the second rigid registration image based on the first rigid registration image; and generating the second corrected image based on the second non-rigid registration result.

In some embodiments, the non-rigid registration may be performed based on a transformation function associated with a similarity between the first rigid registration image and the second rigid registration image.

In some embodiments, the generating the first corrected image based on the first non-rigid registration result may include: determining a first correction weight function corresponding to a first image section of the first rigid registration image corresponding to the overlapping region; and generating the first corrected image based on the first non-rigid registration result and the first correction weight function; and the generating the second corrected image based on the second non-rigid registration result may include: determining, based on the first correction weight function, a second correction weight function corresponding to a second image section of the second rigid registration image corresponding to the overlapping region; and generating the second corrected image based on the second non-rigid registration result and the second correction weight function.

In some embodiments, the first correction weight function may be associated with a height of the first image section and distances of pixels in the first image section to an edge of the first image section. A sum of the first weight function and the second weight function may be 1.

In some embodiments, the farther a pixel in the first image section from an upper edge of the first image section is, the smaller a first correction weight function of the pixel may be.

In some embodiments, the generating the combined image by combining the first corrected image and the second corrected image may include: determining a first fusion weight function corresponding to a first image section of the first corrected image corresponding to the overlapping region; determining, based on the first fusion weight function, a second fusion weight function corresponding to a second image section of the second corrected image corresponding to the overlapping region; determining a fused image corresponding to the overlapping region based on the first image section, the first fusion weight function, the second image section, and the second fusion weight function; and generating the combined image by combining remainder sections of the first corrected image, remainder sections of the second corrected image, and the fused image.

In some embodiments, the first fusion weight function may be associated with distances of pixels in the first image section to an edge of the first image section. A sum of the first fusion weight function and the second fusion weight function may be 1.

According to another aspect of the present disclosure, a non-transitory computer readable medium may be provided. The non-transitory computer readable medium may include executable instructions that, when executed by at least one processor, direct the at least one processor to perform a method. The method may include: obtaining a first image of a first region of a subject; obtaining a second image of a second region of the subject, the first region and the second region having an overlapping region; generating a first corrected image by correcting the first image based on the second image; generating a second corrected image by correcting the second image based on the first image; and generating a combined image by combining the first corrected image and the second corrected image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
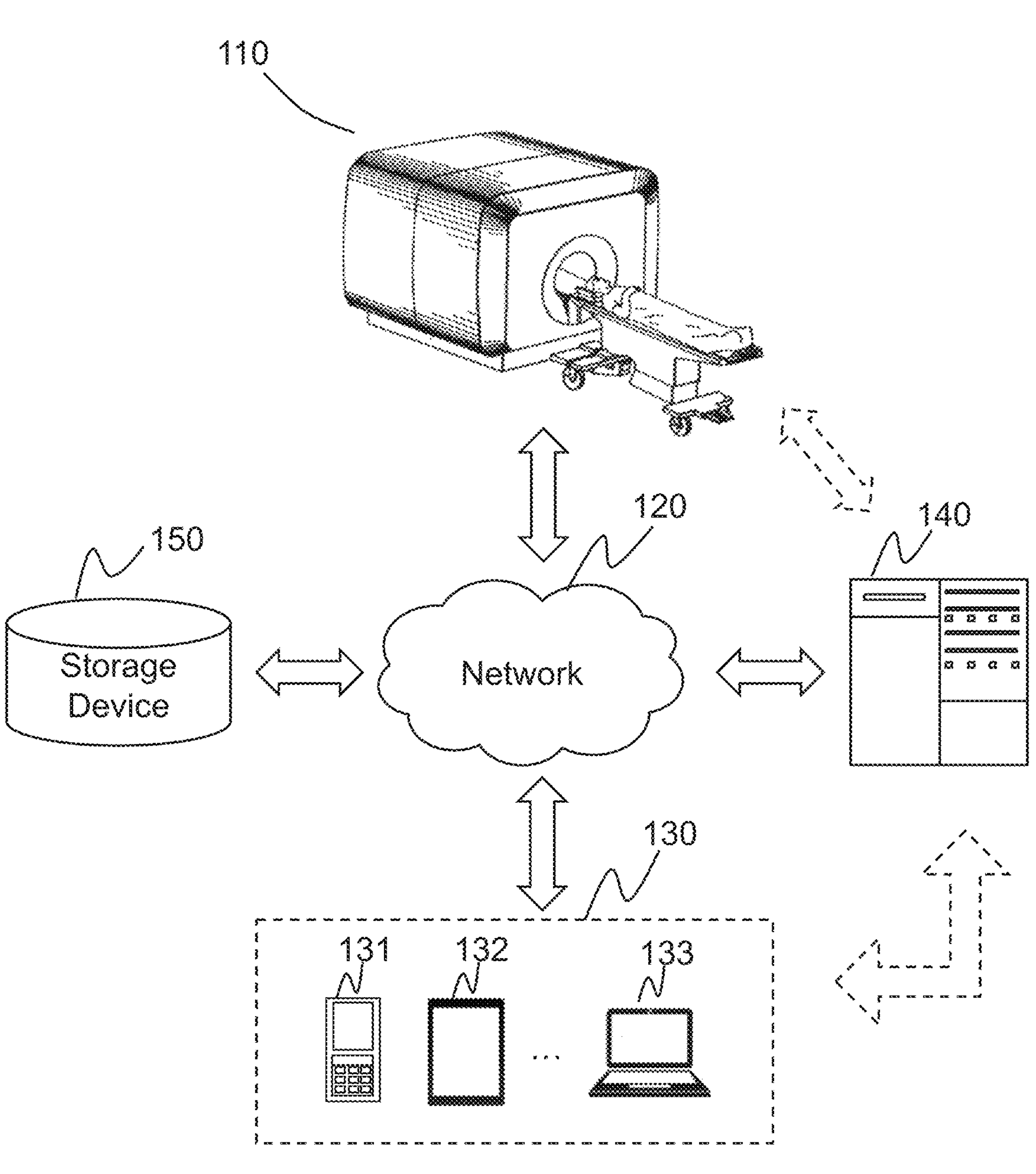
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms “a,” “an,” and “the” may be intended to include the plural forms as well, unless the context clearly indicates otherwise. It will be further understood that the terms “comprise,” “comprises,” and/or “comprising,” “include,” “includes,” and/or “including,” when used in this specification, specify the presence of stated features, integers, steps, operations, elements, and/or components, but do not preclude the presence or addition of one or more other features, integers, steps, operations, elements, components, and/or groups thereof.

It will be understood that the terms “system,” “unit,” “module,” and/or “block” used herein are one method to distinguish different components, elements, parts, sections or assemblies of different levels in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage devices. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer-readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

It will be understood that when a unit, engine, module or block is referred to as being “on,” “connected to,” or “coupled to,” another unit, engine, module, or block, it may be directly on, connected or coupled to, or communicate with the other unit, engine, module, or block, or an intervening unit, engine, module, or block may be present, unless the context clearly indicates otherwise. As used herein, the term “and/or” includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

In the present disclosure, a subject may include a biological object and/or a non-biological object. The biological subject may include a human being, an animal, a plant, or a specific portion, organ, and/or tissue thereof, such as the head, the neck, the thorax, the heart, the stomach, a blood vessel, soft tissue, a tumor, a nodule, or the like, or any combination thereof. The term "object" or "subject" are used interchangeably in the present disclosure.

As used herein, a representation of a subject (e.g., a patient, an object, or a portion thereof) in an image may be referred to the subject for brevity. For instance, a representation of an organ or tissue (e.g., the heart, the liver, a lung, etc., of a patient) in an image may be referred to as the organ or tissue for brevity. An image including a representation of a subject may be referred to as an image of the subject or an image including the subject for brevity.

An aspect of the present disclosure relates to systems and methods for generating a combined image by combining different images. The system may obtain a first image of a first region of a subject and a second image of a second region of the subject. The first region and the second region may have an overlapping region. The system may generate a first rigid registration image corresponding to the first image and a second rigid registration image corresponding to the second image by performing a rigid registration on the first image and the second image. The system may generate a first corrected image by correcting (e.g., by performing a non-rigid registration) the first rigid registration image based on the second rigid registration image and a second corrected image by correcting (e.g., by performing a non-rigid registration) the second rigid registration image based on the first rigid registration image. Further, the system may generate a combined image by combining the first corrected image and the second corrected image.

According to systems and methods of the present disclosure, firstly, the rigid registration may be performed on the first image and the second image to preliminarily register the first image and the second image; secondly, the non-rigid registration may be further performed on the first rigid registration image or the second rigid registration image, with the other image as a reference, accordingly, local information of a first image section of the first image corresponding to the overlapping region coincides with local information of a second image section of the second image corresponding to the overlapping region. Accordingly, a content continuity and the quality of the combined image can be improved. In some embodiments, the rigid registration and/or the non-rigid registration may be performed on the first image section of the first image corresponding to the overlapping region and the second image section of the second image corresponding to the overlapping region, thereby saving computing time and/or computing resource for generating the combined image.

FIG. 1 is a schematic diagram illustrating an exemplary medical system according to some embodiments of the present disclosure. As illustrated, the medical system 100 may include a medical device 110, a network 120, a terminal device 130, a processing device 140, and a storage device 150. The components of the medical system 100 may be connected in one or more of various ways. Merely by way of example, as illustrated in FIG. 1, the medical device 110 may be connected to the processing device 140 through the network 120. As another example, the medical device 110 may be connected to the processing device 140 directly as indicated by the bi-directional arrow in dotted lines linking the medical device 110 and the processing device 140. As a further example, the storage device 150 may be connected to the processing device 140 directly or through the network 120. As still a further example, the terminal device 130 may be connected to the processing device 140 directly (as indicated by the bi-directional arrow in dotted lines linking the terminal device 130 and the processing device 140) or through the network 120.

The medical device 110 may scan a subject located within its detection region and generate imaging data relating to the subject or a portion thereof. In some embodiments, the imaging data may be two-dimensional (2D) imaging data, three-dimensional (3D) imaging data, four-dimensional (4D) imaging data, or the like, or any combination thereof. In some embodiments, the scanning device 110 may include a single modality imaging device. In some embodiments, the medical device 110 may include a magnetic resonance (MR) (e.g., a diffusion weighted MR, a dynamic contrast-enhanced MR (DCE-MR)), an X-ray system, a computed tomography (CT) (e.g., a cone beam CT (CBCT), a helical CT, a multi-slice CT), a positron emission tomography (PET) (e.g., a single-photon emission computed tomography (SPECT), a fluoroscopic device, an ultrasound device, a radiotherapy portal device, a PET-CT, or the like, or any combination thereof.

The network 120 may include any suitable network that can facilitate the exchange of information and/or data for the medical system 100. In some embodiments, one or more components (e.g., the medical device 110, the terminal device 130, the processing device 140, or the storage device 150) of the medical system 100 may communicate information and/or data with one or more other components of the medical system 100 via the network 120. For example, the processing device 140 may obtain a first image of a first region of a subject and a second image of a second region of the subject acquired by the medical device 110 via the network 120, wherein the first image and the second image may have an overlapping region. In some embodiments, the network 120 may be any type of wired or wireless network, or a combination thereof. The network 120 may be and/or include a public network (e.g., the Internet), a private network (e.g., a local area network (LAN), a wide area network (WAN))), a wired network (e.g., an Ethernet network), a wireless network (e.g., an 802.11 network, a Wi-Fi network), a cellular network (e.g., a long term evolution (LTE) network), a frame relay network, a virtual private network (VPN), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the medical system 100 may be connected to the network 120 to exchange data and/or information.

The terminal device 130 may include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. The smart home device may include a smart lighting device, a control device of an intelligent electrical apparatus, a smart monitoring device, a smart television, a smart video camera, an interphone, or the like, or any combination thereof. The wearable device may include a smart bracelet, a smart footgear, a pair of smart glasses, a smart helmet, a smart watch, smart clothing, a smart backpack, a smart accessory, or the like, or any combination thereof. The smart mobile device may include a smartphone, a personal digital assistant (PDA), a gaming device, a navigation device, a point of sale (POS) device, or the like, or any combination thereof. The virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a Hololens, a Gear VR, etc. In some embodiments, the terminal device 130 may remotely operate the medical device 110 and/or the processing device 140. In some embodiments, the terminal device 130 may operate the medical device 110 and/or the processing device 140 via a wireless connection. In some embodiments, the terminal device 130 may receive information and/or instructions inputted by a user, and send the received information and/or instructions to the medical device 110 or to the processing device 140 via the network 120. In some embodiments, the terminal device 130 may receive data and/or information from the processing device 140. In some embodiments, the terminal device 130 may be part of the processing device 140. In some embodiments, the terminal device 130 may be omitted.

The processing device 140 may process data and/or information obtained from the medical device 110, the terminal device 130, and/or the storage device 150. For example, the processing device 140 may generate a first corrected image by correcting a first image based on a second image. As another example, the processing device 140 may generate a second corrected image by correcting a second image based on a first image. As a further example, the processing device 140 may generate a combined image by combining a first corrected image and a second corrected image. In some embodiments, the processing device 140 may be a single server or a server group. The server group may be centralized or distributed. In some embodiments, the processing device 140 may be local or remote. For example, the processing device 140 may access information and/or data stored in or acquired by the medical device 110, the terminal device 130, and/or the storage device 150 via the network 120. As another example, the processing device 140 may be directly connected to the medical device 110 (as illustrated by the bidirectional arrow in dashed lines connecting the processing device 140 and the medical device 110 in FIG. 1), the terminal device 130 (as illustrated by the bidirectional arrow in dashed lines connecting the processing device 140 and the terminal device 130 in FIG. 1), and/or the storage device 150 to access stored or acquired information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 or a portion of the processing device 140 may be integrated into the medical device 110. In some embodiments, the processing device 140 may be implemented by a computing device 200 including one or more components as described in FIG. 2.

The storage device 150 may store data and/or instructions. In some embodiments, the storage device 150 may store data obtained from the medical device 110, the terminal device 130, and/or the processing device 140. For example, the processing device 140 may generate a combined image by combining a first corrected image and a second corrected image, and then the combined image may be stored in the storage device 150 for further use or processing. In some embodiments, the storage device 150 may store data and/or instructions that the processing device 140 may execute or use to perform exemplary methods described in the present disclosure. For example, the storage device 150 may store instructions that the processing device 140 may execute or use to generate a first corrected image and a second corrected image based on a first image and a second image of a subject acquired by the medical device 110. As another example, the storage device 150 may store instructions that the processing device 140 may execute or use to generate a combined image by combining a first corrected image and a second corrected image. In some embodiments, the storage device 150 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the medical device 110, the terminal device 130, the processing device 140) of the medical system 100. One or more components of the medical system 100 may access the data or instructions stored in the storage device 150 via the network 120. In some embodiments, the storage device 150 may be directly connected to or communicate with one or more components (e.g., the medical device 110, the processing device 140, the terminal device 130) of the medical system 100. In some embodiments, the storage device 150 may be part of the processing device 140.

In some embodiments, the medical system 100 may further include one or more power supplies (not shown in FIG. 1) connected to one or more components (e.g., the medical device 110, the terminal device 130, the processing device 140, the storage device 150) of the medical system 100.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure.

Figure 2:
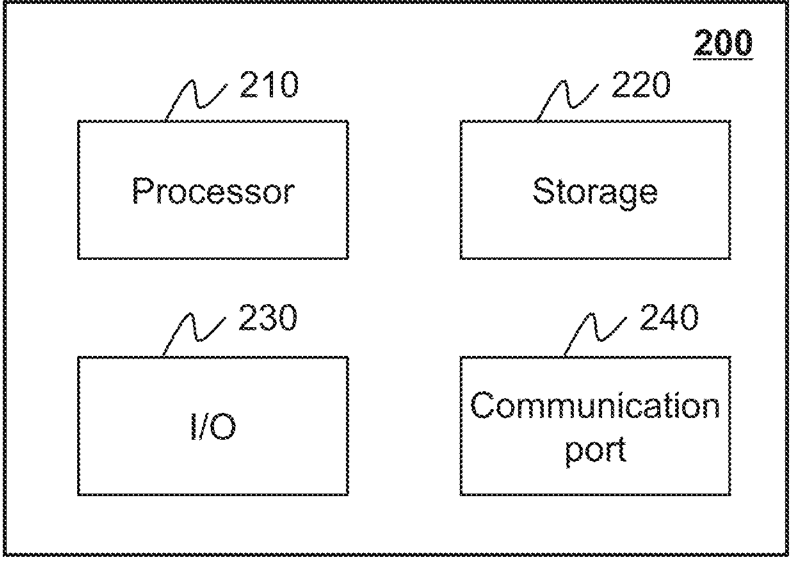
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the processing device 140 may be implemented on the computing device 200. As illustrated in FIG. 2, the computing device 200 may include a processor 210, a storage 220, an input/output (I/O) 230, and a communication port 240.

The processor 210 may execute computer instructions (program code) and perform functions of the processing device 140 in accordance with techniques described herein. The computer instructions may include routines, programs, objects, components, signals, data structures, procedures, modules, and functions, which perform particular functions described herein. In some embodiments, the processor 210 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be noted that the computing device 200 in the present disclosure may also include multiple processors, and thus operations of a method that are performed by one processor as described in the present disclosure may also be jointly or separately performed by the multiple processors. For example, if in the present disclosure the processor of the computing device 200 executes both operations A and B, it should be understood that operations A and B may also be performed by two different processors jointly or separately in the computing device 200 (e.g., a first processor executes operation A and a second processor executes operation B, or the first and second processors jointly execute operations A and B).

The storage 220 may store data/information obtained from the medical device 110, the terminal device 130, the storage device 150, or any other component of the medical system 100. In some embodiments, the storage 220 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 140 for generating a first corrected image and a second corrected image based on a first image and a second image.

The I/O 230 may input or output signals, data, or information. In some embodiments, the I/O 230 may enable user interaction with the processing device 140. In some embodiments, the I/O 230 may include an input device and an output device. Exemplary input devices may include a keyboard, a mouse, a touch screen, a microphone, a trackball, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

Merely by way of example, a user (e.g., an operator) of the processing device 140 may input data related to a subject (e.g., a patient) that is being/to be imaged/scanned through the I/O 230. The data related to the subject may include identification information (e.g., the name, age, gender, medical history, contact information, physical examination result) and/or test information including the nature of the scan that must be performed. The user may also input parameters needed for the operation of the medical device 110, such as image contrast and/or ratio, a region of interest (ROI), or the like, or any combination thereof. The I/O 230 may also display an image (or videos) generated based on the imaging/scan data.

The communication port 240 may be connected to a network (e.g., the network 120) to facilitate data communications. The communication port 240 may establish connections between the processing device 140 and the medical device 110, the terminal device 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include Bluetooth™, Wi-FI®, WiMax, WLAN, ZigBee™, mobile network (e.g., 3G, 4G, 5G), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
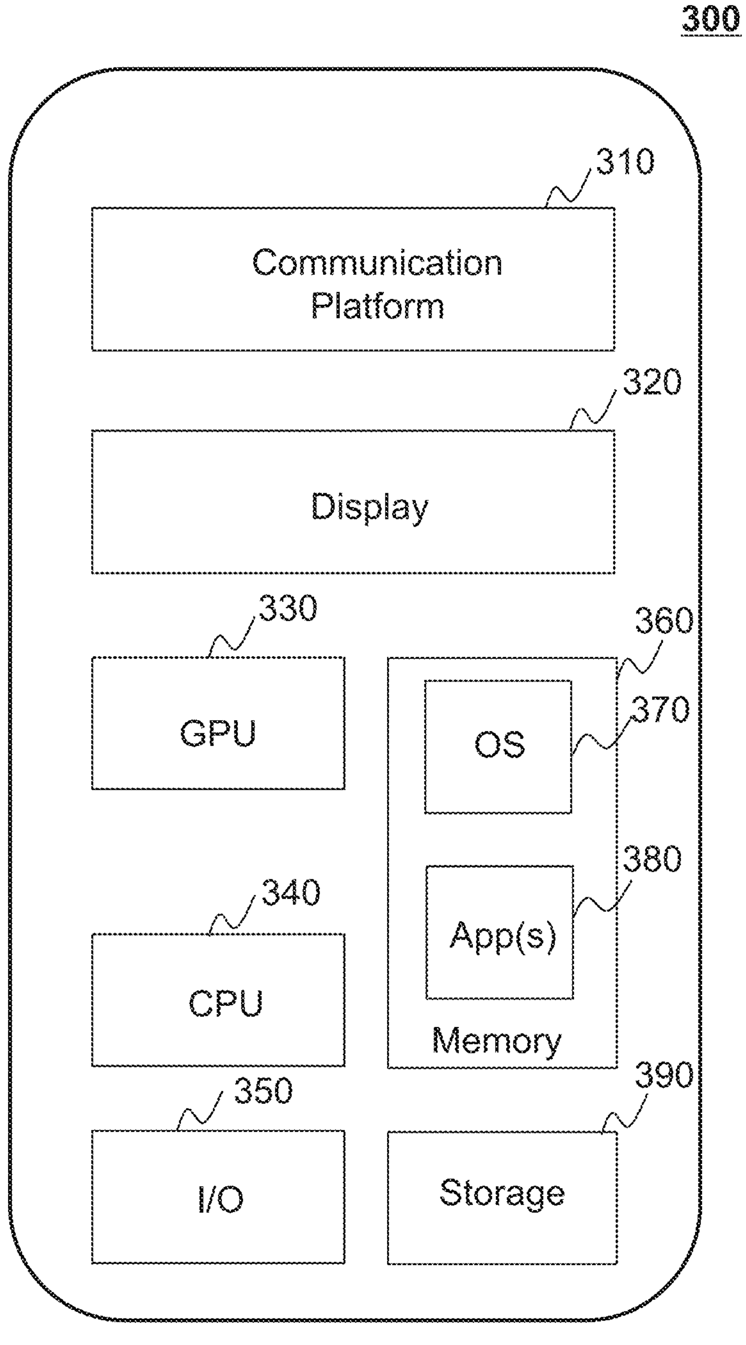
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal device 130 may be implemented on the mobile device 300. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but being not limited to a system bus or a controller (not shown), may also be included in the mobile device 300. In some embodiments, a mobile operating system 370 (e.g., iOS, Android, Windows Phone) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the medical system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the image processing as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
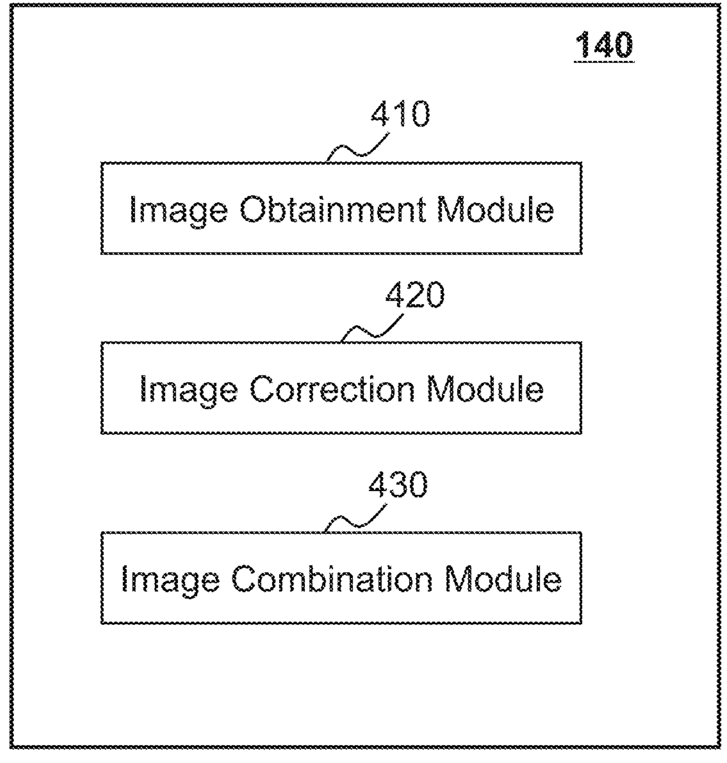
FIG. 4 is a block diagram illustrating an exemplary processing device according to some embodiments of the present disclosure.

FIG. 4 is a block diagram illustrating an exemplary processing device according to some embodiments of the present disclosure. The processing device 140 may include an image obtainment module 410, an image correction module 420, and an image combination module 430.

The image obtainment module 410 may be configured to obtain a first image of a first region of a subject and a second image of a second region of the subject. In some embodiments, the first region and the second region may have an overlapping region. For example, the first region may include the head and the neck of the subject; the second region may include the neck and the chest of the subject. In some embodiments, the overlapping region may correspond to different places of the first image and/or the second image. For example, the overlapping region may correspond to a lower part of the first image and correspond to an upper part of the second image. As another example, the overlapping region may correspond to a right side of the first image and correspond to a left side of the second image.

The image correction module 420 may be configured to generate a first corrected image by correcting the first image based on the second image and a second corrected image by correcting the second image based on the first image. In some embodiments, the image correction module 420 may generate a first rigid registration image corresponding to the first image and a second rigid registration image corresponding to the second image by performing a rigid registration on the first image and the second image. Further, the image correction module 420 may generate the first corrected image by correcting the first rigid registration image based on the second rigid registration image; and generate the second corrected image by correcting the second rigid registration image based on the first rigid registration image. For example, the image correction module 420 may generate a first non-rigid registration result by performing a registration (e.g., a non-rigid registration) on the first rigid registration image using the second rigid registration image as a reference. Further, the image correction module 420 may generate the first corrected image based on the first non-rigid registration result. Similarly, the image correction module 420 may generate a second non-rigid registration result by performing a registration (e.g., a non-rigid registration) on the second rigid registration image using the first rigid registration image as a reference. Further, the image correction module 420 may generate the second corrected image based on the second non-rigid registration result.

In some embodiments, the image correction module 420 may directly perform the non-rigid registration on the first image (or the first image section) based on the second image (or the second image section) and perform the non-rigid rigid registration on the second image (or the second image section) based on the first image (or the first image section) without performing the rigid registration on the first image and the second image. More descriptions regarding the first corrected image and the second corrected image may be found elsewhere in the present disclosure (e.g., FIG. 5 and the descriptions thereof).

Figure 6A:
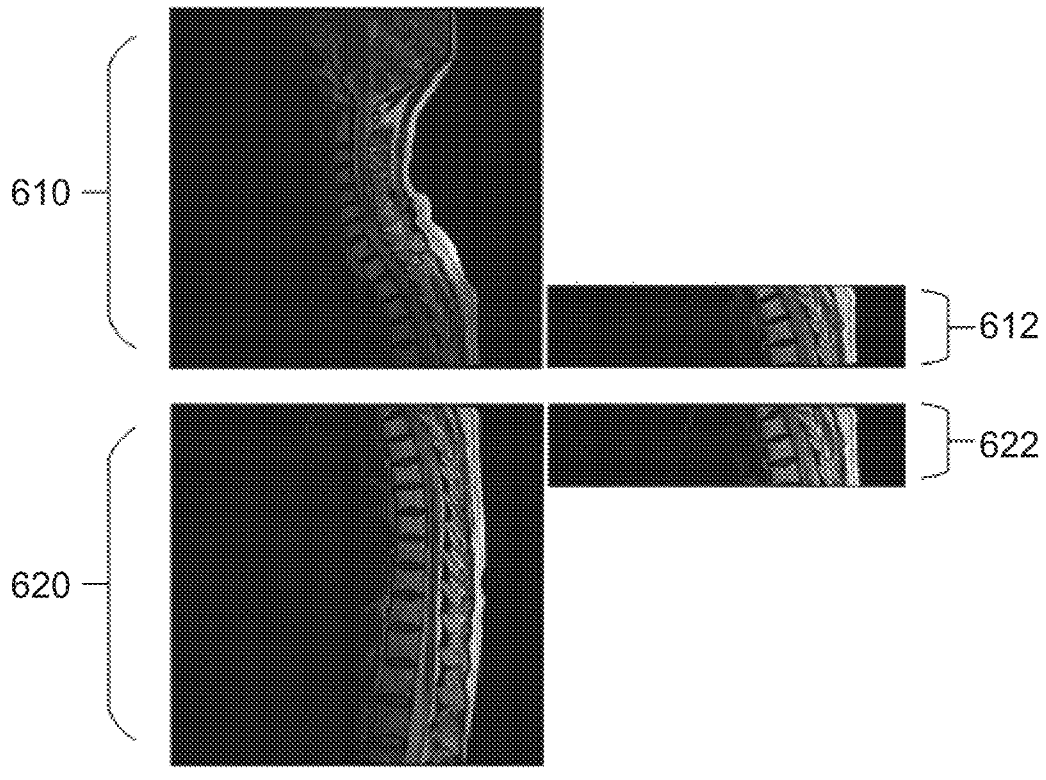
FIG. 6A is a schematic diagram illustrating an exemplary first image and an exemplary second image of a subject according to some embodiments of the present disclosure.
Figure 6B:
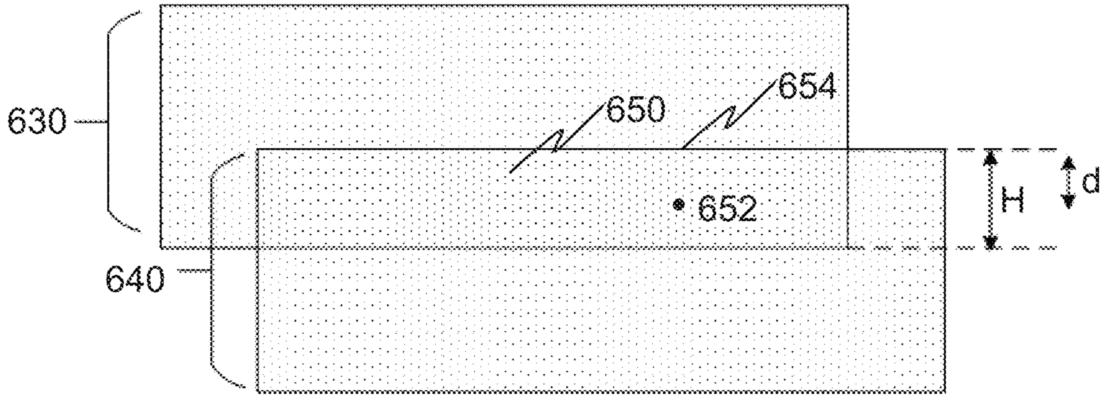
FIG. 6B is a schematic diagram illustrating an exemplary first image and an exemplary second image of a subject according to some embodiments of the present disclosure.

The image combination module 430 may be configured to generate a combined image by combining the first corrected image and the second corrected image. In some embodiments, the image combination module 430 may generate the combined image using an image combination algorithm. In some embodiments, the image combination module 430 may determine a first fusion weight function corresponding to a first image section (i.e., the first corrected image section) of the first corrected image corresponding to the overlapping region and a second fusion weight function corresponding to a second image section (i.e., the second corrected image section) of the second corrected image corresponding to the overlapping region. In some embodiments, for a first pixel in the first image section and a second pixel in the second image section (the first pixel and the second pixel correspond to a same position in the overlapping region), a sum of the first fusion weight function (e.g., a value thereof) and a second fusion weight function (e.g., a value thereof) may be a constant value (e.g., 1). In some embodiments, the first fusion weight function may be associated with distances of pixels in the first image section of the first corrected image to an edge (e.g., an upper edge) of the first image section (as illustrated in FIG. 6A or FIG. 6B, we can assume that the first image section is located above the second image section).

In some embodiments, the image combination module 430 may determine a fused image corresponding to the overlapping region based on the first image section, the first fuse weight function, the second image section, and the second fuse weight function. Further, the image combination module 430 may generate the combined image by combining remainder sections of the first corrected image, remainder sections of the second corrected image, and the fused image. More descriptions regarding the combined image may be found elsewhere in the present disclosure (e.g., FIG. 5 and the descriptions thereof).

The modules in the processing device 140 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 140 may include a storage module (not shown) configured to store data generated by the above-mentioned modules. As another example, two or more of the above-mentioned modules may be combined into a single module or any one of the above-mentioned modules may be divided into two or more units.

Figure 5:
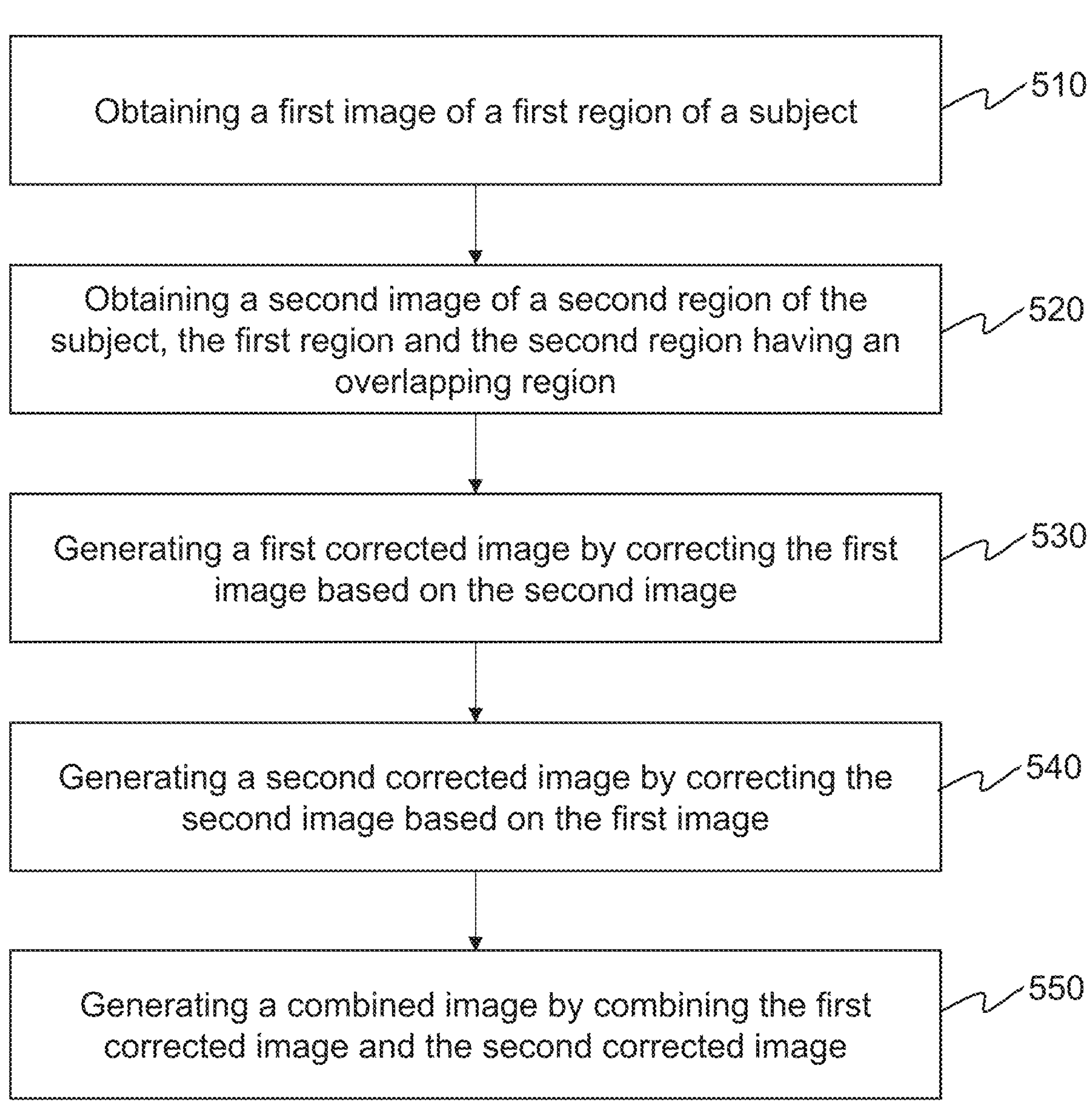
FIG. 5 is a flowchart illustrating an exemplary process for generating a combined image according to some embodiments of the present disclosure.

FIG. 5 is a flowchart illustrating an exemplary process for generating a combined image according to some embodiments of the present disclosure. In some embodiments, the process 500 may be implemented as a set of instructions stored in the storage 220. The processor 210 and/or the modules in FIG. 4 may execute the set of instructions, and when executing the instructions, the processor 210 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process as illustrated in FIG. 5 and described below is not intended to be limiting.

In 510, the processing device 140 (e.g., the image obtainment module 410) (e.g., the interface circuits of the processor 320) may obtain a first image of a first region of a subject.

In 520, the processing device 140 (e.g., the image obtainment module 410) (e.g., the interface circuits of the processor 320) may obtain a second image of a second region of the subject.

In some embodiments, the first region or the second region of the subject may include an abdomen, a chest, a leg, a head, a neck, a lung, a spine, a scapula, a heart, or a portion thereof, or the like, or any combination thereof. In some embodiments, the first region and the second region may have an overlapping region. For example, the first region may include the head and the neck of the subject; the second region may include the neck and the chest of the subject. In some embodiments, the overlapping region may correspond to different places of the first image and/or the second image. For example, the overlapping region may correspond to a lower part of the first image and correspond to an upper part of the second image. As another example, the overlapping region may correspond to a right side of the first image and correspond to a left side of the second image.

In some embodiments, the first image and the second image may be acquired by a same medical device (e.g., the medical device 110). For example, the first image and the second image may be two adjacent images of the subject sequentially acquired by the same medical device. In some embodiments, the processing device 140 may obtain the first image and the second image directly from the medical device 110 or a storage device (e.g., the storage device 150). In some embodiments, the processing device 140 may obtain the first image and the second image from an external source connected to the medical system 100.

In some embodiments, the first image or the second image may include a two-dimensional (2D) image, a three-dimensional (3D) image, a four-dimensional (4D) image, etc. In some embodiments, the first image or the second image may include an MR image (e.g., a diffusion MR image (e.g., a diffusion-weighted MR image), a DCE-MR image, a streaming MR image, a volumetric MR image, a cine MR image), an X-ray image, a CT image (e.g., a CBCT image), a PET image (e.g., a SPECT image), a fluoroscopic image, an ultrasound image, a radiotherapy portal image, or the like, or any combination thereof. Merely by way of example, the first image and the second image may be two diffusion-weighted MR images.

In 530, the processing device 140 (e.g., the image correction module 420) (e.g., the processing circuits of the processor 320) may generate a first corrected image by correcting the first image based on the second image.

In 540, the processing device 140 (e.g., the image correction module 420) (e.g., the processing circuits of the processor 320) may generate a second corrected image by correcting the second image based on the first image.

In some embodiments, the processing device 140 may generate a first rigid registration image corresponding to the first image and a second rigid registration image corresponding to the second image by performing a rigid registration on the first image and the second image. Further, the processing device 140 may generate the first corrected image by correcting the first rigid registration image based on the second rigid registration image; and generate the second corrected image by correcting the second rigid registration image based on the first rigid registration image. For example, the processing device 140 may generate a first non-rigid registration result by performing a registration (e.g., a non-rigid registration) on the first rigid registration image using the second rigid registration image as a reference. Further, the processing device 140 may generate the first corrected image based on the first non-rigid registration result. Similarly, the processing device 140 may generate a second non-rigid registration result by performing a registration (e.g., a non-rigid registration) on the second rigid registration image using the first rigid registration image as a reference. Further, the processing device 140 may generate the second corrected image based on the second non-rigid registration result. More details will be described below.

In some embodiments, the processing device 140 may perform the rigid registration using a rigid registration algorithm. For example, the rigid registration algorithm may include a mutual information (MI) algorithm, a sum of squared differences (SSD) algorithm, a mean absolute difference (MAD) algorithm, a sum of absolute differences (SAD) algorithm, a mean square difference (MSD) algorithm, a normalized cross correlation (NCC) algorithm, a sequential similarity detection algorithm (SSDA), a sum of absolute transformed difference (SATD) algorithm, or the like, or any combination thereof.

In some embodiments, the processing device 140 may perform the rigid registration to align the first image and the second image. In some embodiments, the processing device 140 may determine at least one transformation parameter (e.g., a rotation angle, a translation distance) associated with the first image and the second image. Then the processing device 140 may determine an evaluation parameter (e.g., an SSD, an MAD, an SAD, an MSD, an NCC, an SSDA, a SATD, MI)) of the rigid registration based on the at least one transformation parameter. In response to determining that the evaluation parameter satisfies a preset condition, the processing device 140 may generate the first rigid registration image and the second rigid registration image based on the at least one transformation parameter. In response to determining that the evaluation parameter fails to satisfy the preset condition, the processing device 140 may update at least one of the at least one transformation parameter until the evaluation parameter satisfies the preset condition. Further, the processing device 140 may generate the first rigid registration image and the second rigid registration image based on the at least one updated transformation parameter. Merely by way of example, the processing device 140 may displace or rotate the first image or the second image based on the at least one (updated) transformation parameter, thereby aligning the first image and the second image. In some embodiments, the preset condition may include that the SSD is smaller than a threshold, the MAD is smaller than a threshold, the MI is larger than a threshold, or the like, or any combination thereof.

In some embodiments, the processing device 140 may determine a first image section of the first image corresponding to the overlapping region and a second image section of the second image corresponding to the overlapping region. Further, the processing device 140 may generate the first rigid registration image corresponding to the first image and the second rigid registration image corresponding to the second image by performing the rigid registration on the first image section and the second image section. For example, the processing device 140 may perform the rigid registration on the first image section and the second image section, determine spatial transformation parameters of the rigid registration, and generate the first rigid registration image corresponding to the first image and the second rigid registration image corresponding to the second image based on the spatial transformation parameters.

In some embodiments, the processing device 140 may determine the first image section and the second image section based on location information of the overlapping region in the first image and the second image. In some embodiments, the processing device 140 may determine the location information of the overlapping region in the first image and the second image based on scanning information (e.g., a scanning region) of the subject. The processing device 140 may obtain the scanning information of the subject based on an imaging protocol (e.g., a DICOM protocol) of the subject.

In some embodiments, as described above, after generating the first rigid registration image and the second rigid registration image, the processing device 140 may generate a first non-rigid registration result (which can be considered as a "first deformation field") by performing a non-rigid registration (e.g., a two-dimensional (2D) registration, a three-dimensional (3D) registration) on the first rigid registration image using the second rigid registration image as a reference and generate the first corrected image based on the first non-rigid registration result. Specifically, the processing device 140 may determine a first transformation function associated with a similarity between the second rigid registration image and the first rigid registration image. In some embodiments, the processing device 140 may optimize the first transformation function by adjusting at least one parameter of the first transformation function, for example, to minimize a cost value of the first transformation function. The processing device 140 may perform the non-rigid registration on the first rigid registration image based on the first (optimized) transformation function to generate the first corrected image.

In some embodiments, similarly, the processing device 140 may generate a second non-rigid registration result (which can be considered as a "second deformation field") by performing a non-rigid registration on the second rigid registration image using the first rigid registration image as a reference and generate the second corrected image based on the second non-rigid registration result. The processing device 140 may determine a second transformation function associated with a similarity between the first rigid registration image and the second rigid registration image. In some embodiments, the processing device 140 may optimize the second transformation function by adjusting at least one parameter of the second transformation function, for example, to minimize a cost value of the second transformation function. The processing device 140 may perform the non-rigid registration on the second rigid registration image based on the second (optimized) transformation function to generate the second corrected image.

In some embodiments, the processing device 140 may perform the non-rigid registration based on a non-rigid registration algorithm. For example, the non-rigid registration algorithm may include a linear elastic algorithm, a viscous fluid flow algorithm, a diffusion Demons algorithm, a differential homeomorphic diffusion algorithm, a curvature registration algorithm, a Fourier basis algorithm, a spline basis algorithm, a wavelet basis algorithm, a geometric feature algorithm, an image characteristic feature algorithm, a statistical feature algorithm, or the like, or any combination thereof.

In some embodiments, the processing device 140 may determine a first image section (also referred to as "first rigid registration image section") of the first rigid registration image corresponding to the overlapping region and a second image section (also referred to as "second rigid registration image section") of the second rigid registration image corresponding to the overlapping region. Further, the processing device 140 may perform the non-rigid registration on the first rigid registration image section and the second rigid registration image section. Take the first rigid registration image section as an example, the processing device 140 may determine (or update) a first transformation function associated with a similarity between the second rigid registration image section and the first rigid registration image section. Then the processing device 140 may perform the non-rigid registration on the first rigid registration image section based on the first (updated) transformation function to generate a first corrected image section. Accordingly, the first corrected image section may be used to replace the first rigid registration image section in the first rigid registration image and remainder sections are kept unchanged.

In some embodiments, the processing device 140 may determine a first correction weight function corresponding to the first image section of the first rigid registration image corresponding to the overlapping region, and then generate the first corrected image (or the first corrected image section) based on the first non-rigid registration result and the first correction weight function. The processing device 140 may also determine a second correction weight function corresponding to the second image section of the second rigid registration image corresponding to the overlapping region based on the first correction weight function, and then generate the second corrected image (or the second corrected image section) based on the second non-rigid registration result and the second correction weight function. In some embodiments, for a first pixel in the first image section and a second pixel in the second image section (the first pixel and the second pixel correspond to a same position in the overlapping region), a sum of the first correction weight function (e.g., a value thereof) and the second correction weight function (e.g., a value thereof) may be a constant value (e.g., 1).

In some embodiments, the first correction weight function may be associated with a height of the first image section and distances of pixels in the first image section to an edge (e.g., an upper edge) of the first image section (as illustrated in FIG. 6A or FIG. 6B, we can assume that the first image section is located above the second image section). In some embodiments, the farther a pixel in the first image section from the upper edge of the first image section is, that is, the larger a distance of the pixel in the first image section to the upper edge of the first image section is, the smaller the first correction weight function of the pixel may be. For example, the processing device 140 may determine the first correction weight function and the second correction weight function according to formulas (1) and (2) below:

$$w_B = \frac{1}{2}\left(1 - \cos\frac{\pi \times d}{H}\right), \tag{1}$$

$$w_A = 1 - w_B, \tag{2}$$

where $w_A$ refers to the first correction weight function, $w_B$ refers to the second correction weight function, H refers to the height of the first image section, and d refers to a distance between a pixel and the upper edge of the first image section.

In some embodiments, after determining the first correction weight function and the second correction weight function, the processing device 140 may generate the first corrected image (or the first corrected image section) and the second corrected image (or the second corrected image section) respectively according to formulas (3) and (4) below:

$$I'_A(x,y)=I_A(x,y)\times \text{dis}A\times w_A, \tag{3}$$

$$I'_B(x,y)=I_B(x,y)\times \text{dis}B\times w_B, \tag{4}$$

where $w_A$ refers to the first correction weight function, $w_B$ refers to the second correction weight function, disA refers to the first non-rigid registration result, disB refers to the second non-rigid registration result, $I_A(x, y)$ refers to a pixel (x, y) in the first image section of the first rigid registration image, $I_B(x, y)$ refers to a pixel (x, y) in the second image section of the second rigid registration image, $I'_A(x, y)$ refers to a pixel (x, y) in the first corrected image (or the first corrected image section), and $I'_B(x, y)$ refers to a pixel (x, y) in the second corrected image (or the second corrected image section).

It should be noted that the above descriptions are for illustration purposes and be non-limiting. In some embodiments, the processing device 140 may directly perform the non-rigid registration on the first image (or the first image section) based on the second image (or the second image section) and perform the non-rigid rigid registration on the second image (or the second image section) based on the first image (or the first image section) without performing the rigid registration on the first image and the second image.

In 550, the processing device 140 (e.g., the image combination module 430) (e.g., the processing circuits of the processor 320) may generate a combined image by combining the first corrected image and the second corrected image.

In some embodiments, the processing device 140 may generate the combined image using an image combination algorithm. For example, the image combination algorithm may include a weighted average algorithm (e.g., a stepwise weighted average algorithm), a simple maximum algorithm, a simple minimum algorithm, a simple average algorithm, a principal component analysis (PCA) algorithm, a discrete wavelet transform (DWT) algorithm, or the like, or any combination thereof.

In some embodiments, the processing device 140 may determine a first fusion weight function corresponding to a first image section (i.e., the first corrected image section) of the first corrected image corresponding to the overlapping region and a second fusion weight function corresponding to a second image section (i.e., the second corrected image section) of the second corrected image corresponding to the overlapping region. In some embodiments, for a first pixel in the first image section and a second pixel in the second image section (the first pixel and the second pixel correspond to a same position in the overlapping region), a sum of the first fusion weight function (e.g., a value thereof) and a second fusion weight function (e.g., a value thereof) may be a constant value (e.g., 1).

In some embodiments, the first fusion weight function may be associated with distances of pixels in the first image section of the first corrected image to an edge (e.g., an upper edge) of the first image section (as illustrated in FIG. 6A or FIG. 6B, we can assume that the first image section is located above the second image section). In some embodiments, the farther a pixel in the first image section from the upper edge of the first image section is, that is, the larger a distance of the pixel in the first image section to the upper edge of the first image section is, the smaller the first fusion weight function corresponding to the pixel may be. For example, the processing device 140 may determine the first fusion weight function and the second fusion weight function according to formulas (5) and (6) below:

$$a = \frac{H - d}{H}, \tag{5}$$

$$b = 1 - b, \tag{6}$$

where a refers to the first fusion weight function, b refers to the second fusion weight function, H refers to the height of the first image section, and d refers to a distance between a pixel and the upper edge of the first image section.

In some embodiments, the processing device 140 may determine a fused image corresponding to the overlapping region based on the first image section, the first fuse weight function, the second image section, and the second fuse weight function. For example, the processing device 140 may determine the fused image according to formulas (7) and (8) below:

$$I(x,y)=aI'_A(x,y)+bI'_B(x,y), \tag{7}$$

$$a+b=1, \tag{8}$$

where a refers to the first fusion weight function, b refers to the second fusion weight function, $I'_A(x, y)$ refers to a pixel (x, y) in the first image section of the first corrected image, $I'_B(x, y)$ refers to a pixel (x, y) in the second image section of the first corrected image, and I(x, y) refers to a pixel (x, y) in the fused image.

Further, the processing device 140 may generate the combined image by combining remainder sections of the first corrected image, remainder sections of the second corrected image, and the fused image.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIGS. 6A and 6B are a schematic diagram illustrating an exemplary first image and an exemplary second image of a subject according to some embodiments of the present disclosure.

As shown in FIG. 6A, a first image 610 may include a first region of a subject and a second image 620 may include a second region of the subject. The first region and the second region may have an overlapping region. Accordingly, the first image 610 includes a first image section 612 corresponding to the overlapping region and the second image 620 includes a second image section 622 corresponding to the overlapping region.

As shown in FIG. 6B, a first image 630 may include a first region of a subject and a second image 640 may include a second region of the subject. The first region and the second region may have an overlapping region 650. As described in connection with FIG. 5, take a pixel 652 in the first image 630 (or in a first image section of the first image 630 corresponding to the overlapping region) as an example, a first correction weight function of the pixel 652 may be associated with a height (e.g., H) of the first image section corresponding to the overlapping region and a distance (e.g., d) of the pixel 652 to an upper edge 654 of the first image section.

Figure 7A:
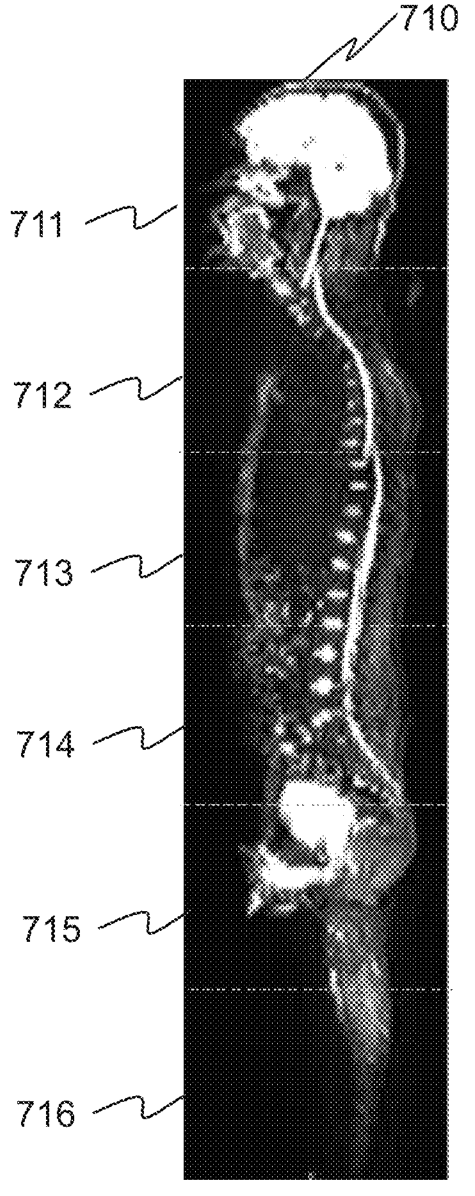
FIG. 7A is a schematic diagram illustrating an exemplary combined image determined based on a rigid registration.
Figure 7A:
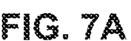
Figure 7B:
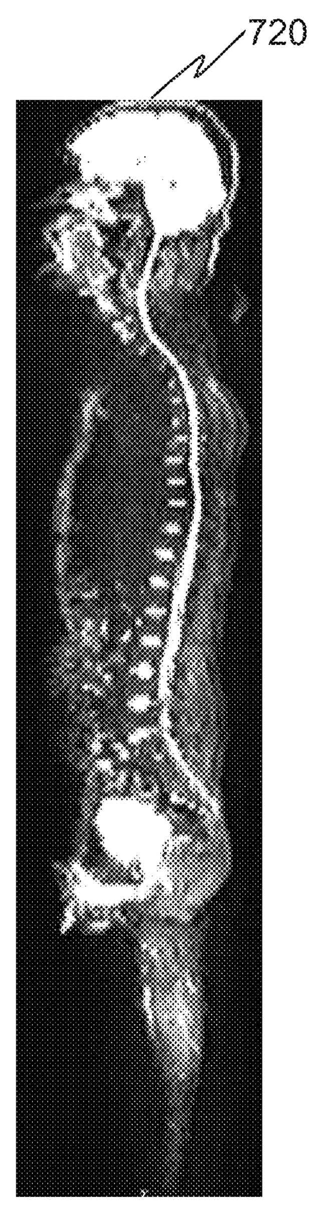
FIG. 7B is a schematic diagram illustrating an exemplary combined image according to some embodiments of the present disclosure.

FIG. 7A is a schematic diagram illustrating an exemplary combined image determined based on a rigid registration. FIG. 7B is a schematic diagram illustrating an exemplary combined image according to some embodiments of the present disclosure.

As illustrated in FIG. 7A, there are six images (e.g., a first image 711, a second image 712, a third image 713, a fourth image 714, a fifth image 715, and a sixth image 716) to be combined, wherein any adjacent two images have an overlapping region. Further, a combined image 710 was generated by performing a rigid registration on the six images. As illustrated in FIG. 7B, a combined image 720 was generated according to the method (e.g., process 500) described in the present disclosure. It can be seen that a content continuity of the combined image 720 is clearly better than a content continuity of the combined image 710.

Figure 8:
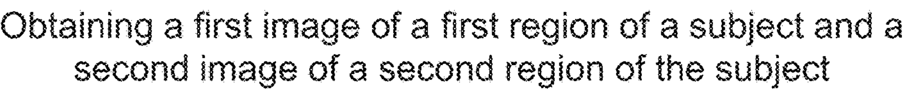
FIG. 8 is a flowchart illustrating an exemplary process for generating a combined image according to some embodiments of the present disclosure.

FIG. 8 is a flowchart illustrating an exemplary process for generating a combined image according to some embodiments of the present disclosure. In some embodiments, the process 800 may be implemented as a set of instructions stored in the storage 220. The processor 210 and/or the modules in FIG. 4 may execute the set of instructions, and when executing the instructions, the processor 210 and/or the modules may be configured to perform the process 800. The operations of the illustrated process presented below are intended to be illustrative. In some embodiments, the process 800 may be accomplished with one or more additional operations not described and/or without one or more of the operations herein discussed. Additionally, the order in which the operations of the process as illustrated in FIG. 8 and described below is not intended to be limiting.

In 810, the processing device 140 (e.g., the image obtainment module 410) (e.g., the interface circuits of the processor 320) may obtain a first image of a first region of a subject and a second image of a second region of the subject. The first region and the second region may have an overlapping region. More descriptions regarding the first image and the second image may be found elsewhere in the present disclosure (e.g., operations 510 and 520 in FIG. 5 and the descriptions thereof).

In 820, the processing device 140 (e.g., the image correction module 420) (e.g., the processing circuits of the processor 320) may generate a first corrected image corresponding to the first image by performing a non-rigid registration on the first image using the second image as a reference.

In 830, the processing device 140 (e.g., the image correction module 420) (e.g., the processing circuits of the processor 320) may generate a second corrected image corresponding to the second image by performing a non-rigid registration on the second image using the first image as a reference. More descriptions regarding the first corrected image and the second corrected image may be found elsewhere in the present disclosure (operations 530 and 540 in FIG. 5 and the descriptions thereof).

In 840, the processing device 140 (e.g., the image combination module 430) (e.g., the processing circuits of the processor 320) may generate a combined image based on the first corrected image and the second corrected image. More descriptions regarding the generation of the combined image may be found elsewhere in the present disclosure (operation 550 in FIG. 5 and the descriptions thereof).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 9A:
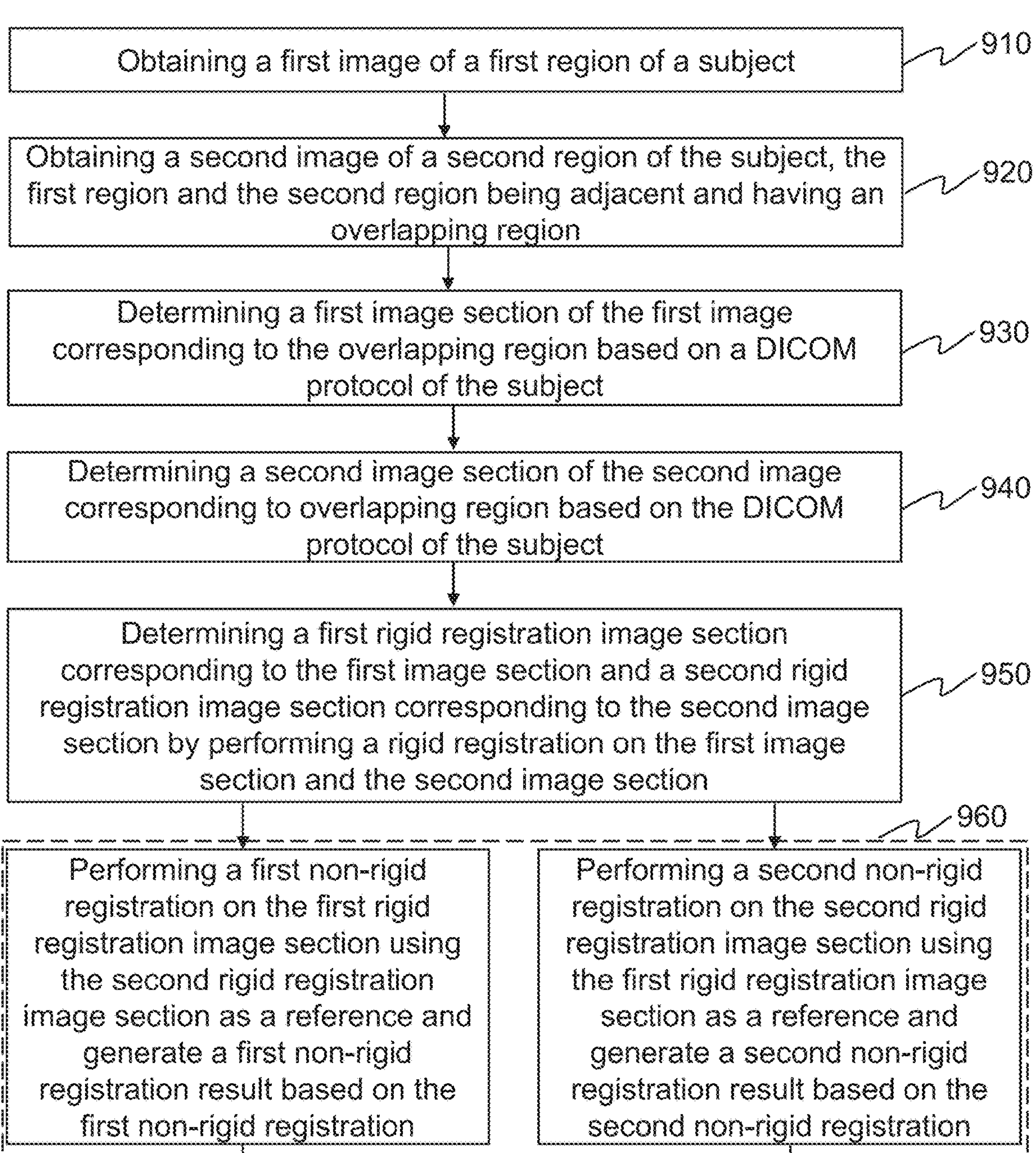
FIGS. 9A and 9B are a flowchart illustrating an exemplary process for generating a combined image according to some embodiments of the present disclosure.
Figure 9B:
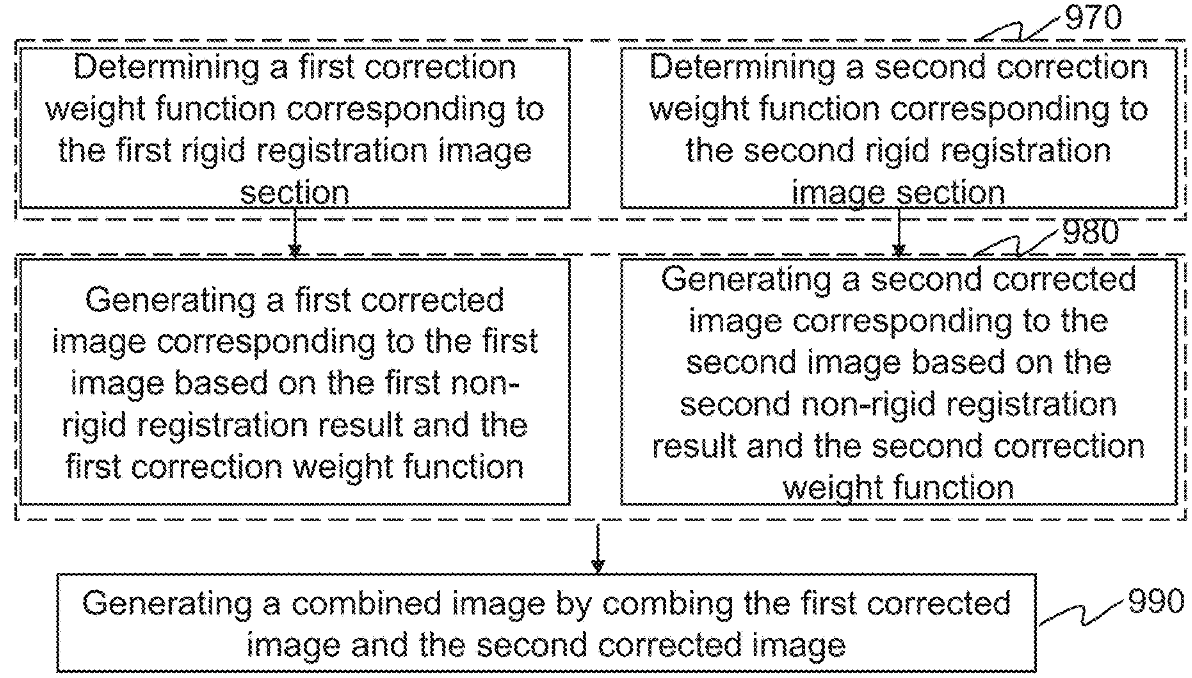

FIGS. 9A and 9B are a flowchart illustrating an exemplary process for generating a combined image according to some embodiments of the present disclosure. In some embodiments, the process 900 may be implemented as a set of instructions stored in the storage 220. The processor 210 and/or the modules in FIG. 4 may execute the set of instructions, and when executing the instructions, the processor 210 and/or the modules may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process as illustrated in FIG. 9 and described below is not intended to be limiting.

In 910, the processing device 140 (e.g., the image obtainment module 410) (e.g., the interface circuits of the processor 320) may obtain a first image of a first region of a subject.

In 920, the processing device 140 (e.g., the image obtainment module 410) (e.g., the interface circuits of the processor 320) may obtain a second image of a second region of the subject.

In some embodiments, the first region and the second region may be adjacent and have an overlapping region. Operations 910 and 920 may be similar to operations 510 and 520, the descriptions of which are not repeated here.

In 930, the processing device 140 (e.g., the image correction module 420) (e.g., the processing circuits of the processor 320) may determine a first image section of the first image corresponding to the overlapping region based on a DICOM protocol of the subject.

In 940, the processing device 140 (e.g., the image correction module 420) (e.g., the processing circuits of the processor 320) may determine a second image section of the second image corresponding to the overlapping region based on the DICOM protocol of the subject.

In 950, the processing device 140 (e.g., the image correction module 420) (e.g., the processing circuits of the processor 320) may determine a first rigid registration image section corresponding to the first image section and a second rigid registration image section corresponding to the second image section by performing a rigid registration on the first image section and the second image section.

In 960, the processing device 140 (e.g., the image correction module 420) (e.g., the processing circuits of the processor 320) may perform a first non-rigid registration on the first rigid registration image section using the second rigid registration image section as a reference and generate a first non-rigid registration result based on the first non-rigid registration. The processing device 140 may also perform a second non-rigid registration on the second rigid registration image section using the first rigid registration image section as a reference and generate a second non-rigid registration result based on the second non-rigid registration.

In 970, the processing device 140 (e.g., the image correction module 420) (e.g., the processing circuits of the processor 320) may determine a first correction weight function corresponding to the first rigid registration image section. The processing device 140 may also determine a second correction weight function corresponding to the second rigid registration image section.

In 980, the processing device 140 (e.g., the image correction module 420) (e.g., the processing circuits of the processor 320) may generate a first corrected image corresponding to the first image based on the first non-rigid registration result and the first correction weight function. The processing device 140 may also generate a second corrected image corresponding to the second image based on the second non-rigid registration result and the second correction weight function. Operations 930-980 may be similar to operations 530-540, the descriptions of which are not repeated here.

In 990, the processing device 140 (e.g., the image correction module 420) (e.g., the processing circuits of the processor 320) may generate a combined image by combing the first corrected image and the second corrected image. Operation 990 may be similar to operation 550, the descriptions of which are not repeated here.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A computer-readable signal medium may include a propagated data signal with computer-readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java®, Scala™, Smalltalk®, Eiffel®, C++®, C#®, VB.NET®, Python® or the like, conventional procedural programming languages, such as the "C" programming language, Visual Basic®, Fortran® 2003, Perl®, COBOL® 2002, PHP®, ABAP®, dynamic programming languages such as Python®, Ruby® and Groovy™, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS)™.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject 440 matter requires more features than are expressly recited in each claim. Rather, claimed subject 440 matter may lie in smaller than all features of a single foregoing disclosed embodiment.

What is claimed is:

1. A system, comprising:

at least one storage device including a set of instructions;

at least one processor in communication with the at least one storage device, wherein when executing the set of instructions, the at least one processor is configured to cause the system to:

obtain a first image of a first region of a patient;

obtain a second image of a second region of the patient, the first region and the second region having an overlapping region, wherein the first image and the second image are acquired by a medical device using different acquisition parameters, respectively, and the first region and the second region include at least one body part of the patient;

generate, using a non-rigid registration, a first corrected image by correcting the first image based on the second image;

generate, using the non-rigid registration, a second corrected image by correcting the second image based on the first image; and generate a combined image by combining the first corrected image and the second corrected image.

2. The system of claim 1, wherein to generate, using the non-rigid registration, the first corrected image by correcting the first image based on the second image, the at least one processor is directed to:

generate a first rigid registration image corresponding to the first image and a second rigid registration image corresponding to the second image by performing a rigid registration on the first image and the second image; and generate the first corrected image by correcting the first rigid registration image based on the second rigid registration image; and to generate, using the non-rigid registration, the second corrected image by correcting the second image based on the first image, the at least one processor is directed to:

generate the second corrected image by correcting the second rigid registration image based on the first rigid registration image.

3. The system of claim 2, wherein to generate the first rigid registration image corresponding to the first image and the second rigid registration image corresponding to the second image by performing the rigid registration on the first image and the second image, the at least one processor is directed to:

determine a first image section of the first image corresponding to the overlapping region;

determine a second image section of the second image corresponding to the overlapping region; and generate the first rigid registration image corresponding to the first image and the second rigid registration image corresponding to the second image by performing the rigid registration on the first image section and the second image section.

4. The system of claim 2, wherein to generate the first corrected image by correcting the first rigid registration image based on the second rigid registration image, the at least one processor is directed to:

generate a first non-rigid registration result by performing the non-rigid registration on the first rigid registration image based on the second rigid registration image; and generate the first corrected image based on the first non-rigid registration result; and to generate the second corrected image by correcting the second rigid registration image based on the first rigid registration image, the at least one processor is directed to:

generate a second non-rigid registration result by performing the non-rigid registration on the second rigid registration image based on the first rigid registration image; and generate the second corrected image based on the second non-rigid registration result.

5. The system of claim 4, wherein the non-rigid registration is performed based on a transformation function associated with a similarity between the first rigid registration image and the second rigid registration image.

6. The system of claim 4, wherein to generate the first corrected image based on the first non-rigid registration result, the at least one processor is directed to:

determine a first correction weight function corresponding to a first image section of the first rigid registration image corresponding to the overlapping region; and generate the first corrected image based on the first non-rigid registration result and the first correction weight function; and to generate the second corrected image based on the second non-rigid registration result, the at least one processor is directed to:

determine, based on the first correction weight function, a second correction weight function corresponding to a second image section of the second rigid registration image corresponding to the overlapping region; and generate the second corrected image based on the second non-rigid registration result and the second correction weight function.

7. The system of claim 6, wherein the first correction weight function is associated with a height of the first image section and distances of pixels in the first image section to an edge of the first image section; and a sum of the first correction weight function and the second correction weight function is 1.

8. The system of claim 7, wherein the farther a pixel in the first image section from an upper edge of the first image section is, the smaller a first correction weight function of the pixel is.

9. The system of claim 1, wherein to generate the combined image by combining the first corrected image and the second corrected image, the at least one processor is directed to:

determine a first fusion weight function corresponding to a first image section of the first corrected image corresponding to the overlapping region;

determine, based on the first fusion weight function, a second fusion weight function corresponding to a second image section of the second corrected image corresponding to the overlapping region;

determine a fused image corresponding to the overlapping region based on the first image section, the first fusion weight function, the second image section, and the second fusion weight function; and generate the combined image by combining remainder sections of the first corrected image, remainder sections of the second corrected image, and the fused image.

10. The system of claim 9, wherein the first fusion weight function is associated with distances of pixels in the first image section to an edge of the first image section; and a sum of the first fusion weight function and the second fusion weight function is 1.

11. A method implemented on a computing device including at least one processor, at least one storage medium, and a communication platform connected to a network, the method comprising:

obtaining a first image of a first region of a patient;

obtaining a second image of a second region of the patient, the first region and the second region having an overlapping region, wherein the first image and the second image are acquired by a medical device using different acquisition parameters, respectively, and the first region and the second region include at least one body part of the patient;

generating, using a non-rigid registration, a first corrected image by correcting the first image based on the second image;

generating, using the non-rigid registration, a second corrected image by correcting the second image based on the first image; and generating a combined image by combining the first corrected image and the second corrected image.

12. The method of claim 11, wherein the generating, using a non-rigid registration, the first corrected image by correcting the first image based on the second image includes:

generating a first rigid registration image corresponding to the first image and a second rigid registration image corresponding to the second image by performing a rigid registration on the first image and the second image; and generating the first corrected image by correcting the first rigid registration image based on the second rigid registration image; and the generating, using the non-rigid registration, the second corrected image by correcting the second image based on the first image includes:

generating the second corrected image by correcting the second rigid registration image based on the first rigid registration image.

13. The method of claim 12, wherein the generating the first rigid registration image corresponding to the first image and the second rigid registration image corresponding to the second image by performing the rigid registration on the first image and the second image includes:

determining a first image section of the first image corresponding to the overlapping region;

determining a second image section of the second image corresponding to the overlapping region; and generating the first rigid registration image corresponding to the first image and the second rigid registration image corresponding to the second image by performing the rigid registration on the first image section and the second image section.

14. The method of claim 12, wherein the generating the first corrected image by correcting the first rigid registration image based on the second rigid registration image includes:

generating a first non-rigid registration result by performing the non-rigid registration on the first rigid registration image based on the second rigid registration image; and generating the first corrected image based on the first non-rigid registration result; and the generating the second corrected image by correcting the second rigid registration image based on the first rigid registration image includes:

generating a second non-rigid registration result by performing the non-rigid registration on the second rigid registration image based on the first rigid registration image; and generating the second corrected image based on the second non-rigid registration result.

15. The method of claim 14, wherein the non-rigid registration is performed based on a transformation function associated with a similarity between the first rigid registration image and the second rigid registration image.

16. The method of claim 14, wherein the generating the first corrected image based on the first non-rigid registration result includes:

determining a first correction weight function corresponding to a first image section of the first rigid registration image corresponding to the overlapping region; and generating the first corrected image based on the first non-rigid registration result and the first correction weight function; and the generating the second corrected image based on the second non-rigid registration result includes:

determining, based on the first correction weight function, a second correction weight function corresponding to a second image section of the second rigid registration image corresponding to the overlapping region; and generating the second corrected image based on the second non-rigid registration result and the second correction weight function.

17. The method of claim 16, wherein the first correction weight function is associated with a height of the first image section and distances of pixels in the first image section to an edge of the first image section; and a sum of the first weight function and the second weight function is 1.

18. The method of claim 11, wherein the generating the combined image by combining the first corrected image and the second corrected image includes:

determining a first fusion weight function corresponding to a first image section of the first corrected image corresponding to the overlapping region;

determining, based on the first fusion weight function, a second fusion weight function corresponding to a second image section of the second corrected image corresponding to the overlapping region;

determining a fused image corresponding to the overlapping region based on the first image section, the first fusion weight function, the second image section, and the second fusion weight function; and generating the combined image by combining remainder sections of the first corrected image, remainder sections of the second corrected image, and the fused image.

19. A non-transitory computer readable medium, comprising executable instructions that, when executed by at least one processor, direct the at least one processor to perform a method, the method comprising:

obtaining a first image of a first region of a patient;

obtaining a second image of a second region of the patient, the first region and the second region having an overlapping region, wherein the first image and the second image are acquired by a medical device using different acquisition parameters, respectively, and the first region and the second region include at least one body part of the patient;

generating, using a non-rigid registration, a first corrected image by correcting the first image based on the second image;

generating, using the non-rigid registration, a second corrected image by correcting the second image based on the first image; and generating a combined image by combining the first corrected image and the second corrected image.

20. The The system of claim 1, wherein to generate, using a non-rigid registration, a first corrected image by correcting the first image based on the second image, the at least one processor is directed to:

determine a first correction weight function based on the first image and the second image; and generate the first corrected image based on the first image and the first correction weight function; and to generate, using the non-rigid registration, a second corrected image by correcting the second image based on the first image, the at least one processor is directed to:

determine, based on the first correction weight function, a second correction weight function; and generate the second corrected image based on the second image and the second correction weight function.

* * * * *